United States Patent [19]

Weisenborn

[11] Patent Number: 5,142,469
[45] Date of Patent: Aug. 25, 1992

[54] METHOD FOR CONVERTING A PROGRAMMABLE LOGIC CONTROLLER HARDWARE CONFIGURATION AND CORRESPONDING CONTROL PROGRAM FOR USE ON A FIRST PROGRAMMABLE LOGIC CONTROLLER TO USE ON A SECOND PROGRAMMABLE LOGIC CONTROLLER

[75] Inventor: Gerald M. Weisenborn, Ruckersville, Va.

[73] Assignee: GE Fanuc Automation North America, Inc., Charlottesville, Va.

[21] Appl. No.: 501,612

[22] Filed: Mar. 29, 1990

[51] Int. Cl.⁵ .................. G06F 9/06; G06F 15/60
[52] U.S. Cl. .................... 364/146; 364/147; 364/DIG. 2; 364/927.81; 364/926.9; 364/949; 395/500; 395/919; 395/921; 395/922
[58] Field of Search .................. 364/140-147, 364/DIG. 2, DIG. 1, 200 MS File, 900 MS File; 395/919, 921, 922, 920, 500

[56] References Cited

U.S. PATENT DOCUMENTS

| | | | |
|---|---|---|---|
| 4,250,563 | 2/1981 | Struger | 364/900 |
| 4,504,927 | 3/1985 | Callan | 364/900 |
| 4,677,548 | 6/1987 | Bradley | 364/200 |
| 4,849,928 | 7/1989 | Hauck | 364/900 |
| 5,038,317 | 8/1991 | Callan et al. | 364/137 X |

Primary Examiner—Joseph Ruggiero
Attorney, Agent, or Firm—James H. Beusse

[57] ABSTRACT

A method is provided for converting a hardware configuration and corresponding control logic program for use on a first programmable logic controller (PLC) to an equivalent hardware configuration and control logic program for use on a second PLC. A graphic representation of hardware modules which are usable with the first PLC are displayed for the user's consideration. The user selects those modules which are actually employed in a particular hardware configuration for the first PLC and a first hardware configuration file is created therefrom. A determination is then made of those second PLC hardware modules which are equivalent to the first PLC hardware modules contained in the first hardware configuration file. This determination is made by referencing a first data base which includes information as to which hardware modules for use on the second PLC are equivalent to corresponding hardware modules for use on the first PLC. A mapping of I/O points from the first PLC to I/O points of the second PLC is then generated. These determining and generating a mapping steps define the second hardware configuration of the second PLC. The method further includes generating a second control program for use with the second PLC from the statements of the first PLC and the mapping of I/O points. This is accomplished by checking each statement of the first control program with a second data base to determine an equivalent statement for the second control program.

9 Claims, 3 Drawing Sheets

```
               610       615
          MAP ("000","% I1")
          MAP ("001","% I2")
          MAP ("002","% I3")
          MAP ("003","% I4")
          MAP ("004","% I5")
          MAP ("005","% I6")
          MAP ("006","% I7")
          MAP ("600","%T0235)
          MAP ("601","%T0236)
```

METHOD FOR CONVERTING A PROGRAMMABLE LOGIC CONTROLLER HARDWARE CONFIGURATION AND CORRESPONDING CONTROL PROGRAM FOR USE ON A FIRST PROGRAMMABLE LOGIC CONTROLLER TO USE ON A SECOND PROGRAMMABLE LOGIC CONTROLLER

BACKGROUND OF THE INVENTION

This invention relates in general to programmable logic controllers and, more particularly, to a method for converting an existing programmable logic controller hardware configuration and control program into another equivalent programmable logic controller hardware configuration and equivalent control program.

Programmable logic controllers (PLC's) are a relatively recent development in process control technology. As a part of process control, a programmable logic controller is used to monitor input signals from a variety of input modules (input sensors) which report events and conditions occurring in a controlled process. For example, a PLC can monitor such input conditions as motor speed, temperature, pressure, volumetric flow and the like. A control program is stored in a memory within the PLC to instruct the PLC what actions to take upon encountering particular input signals or conditions. In response to these input signals provided by input sensors, the PLC derives and generates output signals which are transmitted to various output devices to control the process. For example, the PLC issues output signals to speed up or slow down a motor, open or close a relay, raise or lower temperature or adjust pressure as well as many other possible control functions too numerous to list.

A typical PLC includes a rack into which a plurality of input/output cards may be placed. A rack includes several slots into which these input/output cards are installed. Each input/output card has a plurality of I/O points. An I/O bus couples the cards in the slots back to the processor of the PLC. The particular processor employed in a PLC together with the particular choice of input and output cards installed in the PLC rack are often referred to as the hardware configuration of the PLC. The hardware configuration also includes the particular addresses which the I/O cards employ.

As programmable logic controller technology progresses, it often becomes desirable to replace old programmable logic controllers (PLC's) with new programmable logic controllers. When it becomes necessary to configure a new programmable logic controller to be equivalent to an old or other programmable logic controller, both new equivalent hardware must be selected and new equivalent controller logic programming (control program) must be generated. Often, incompatibilities will exist in hardware rack sizes, I/O module densities, I/O point addressing and in programming constructs between the original and the new PLCs. There are often many complexities in the hardware selection process and in the logic programming of the control program.

BRIEF SUMMARY OF THE INVENTION

Accordingly, one object of the present invention is to provide a method for converting a PLC hardware configuration and control program for a first PLC into an equivalent PLC hardware configuration and control program for a second PLC which is different from the first PLC.

Another object is to provide a method for converting and translating a ladder logic control program operable on the first PLC into an equivalent ladder logic control program operable on the second PLC.

Yet another object of the invention is to generate an equivalent second control program in the form of a high level keystroke format which is substantially independent of the internal logic of the second programmable logic controller.

In accordance with the present invention, a method is provided for converting a first control program and a first hardware configuration for a first PLC to a second control program and a second hardware configuration for a second PLC. The first and second control programs include a plurality of statements. The method of the invention includes the steps of providing configuration information with respect to the first hardware configuration of the first PLC to a processor; providing the first PLC control program to the processor; and selecting the second hardware configuration to be equivalent to the first hardware configuration by the processor by referencing a data base which relates the first hardware configuration to possible second hardware configurations. The method also includes generating a mapping of I/O points from the first PLC to the second PLC. The method still further includes the step of generating the second control program to be equivalent to the first control program wherein the second control program is generated by the processor referencing each statement of the first control program and determining a statement operative on the second PLC which is equivalent thereto.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

A high level description of the conversion process of the present invention follows.

The first step in the conversion process of the present invention is to obtain a one-for-one mapping of the physical input and output (I/O) points from the original PLC system (first PLC) to the new target PLC system (second PLC). A knowledge based artificial intelligence (AI) program is used to select the required modules or I/O cards in the rack of the new programmable logic controller using a matching process based on the modules or I/O cards in the rack of the original programmable logic controller. The equivalent I/O point addresses are then determined and a mapping of the new I/O point addresses to the original I/O point addresses is generated.

In the second step of the process, the list of logic program statements of the original PLC control program is converted to the equivalent programming constructs of the new PLC system. The AI computer program operates on an original or first control program file containing an ASCII representation of ladder logic constructs from the original PLC system in the form of a symbolic representation thereof. This file is processed rung by rung and symbol by symbol so as to automatically reassign I/O addresses from the mapping done in the first step of the process into a set of key strokes which produce equivalent logic for the new programmable logic controller. Portions of the original control program logic which can not be automatically converted are identified and flagged for manual intervention and resolution.

A play-back feature of a programmable logic controller programming package for the new PLC automatically types both the equivalent new hardware configuration and the equivalent new control program into the new programmable logic controller so that the user does not have to perform this task manually. This translated logic is in the form of a keystroke file. That is, the new PLC has a programming package associated therewith which is capable of accepting either a control program entered by manually generated keystrokes or of accepting a keystroke file which takes the place of manually entered keystrokes. After the resolution of a relatively small percentage of unconverted logic which requires manual intervention, a new executable control program for the new programmable controller is generated as explained later.

Figure 1:
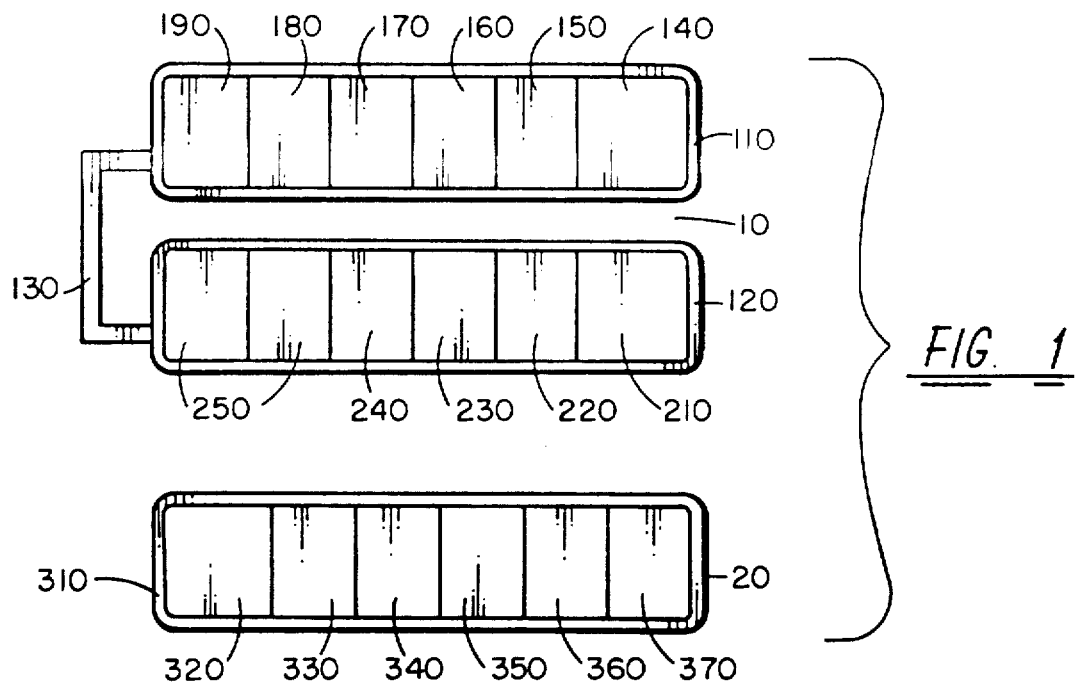
FIG. 1 is a block diagram of original and new target programmable logic controller racks with which the method of the present invention may be employed.

In more detail, the method of the invention is illustrated by reference to FIG. 1 where the logic hardware of an original programmable logic controller (PLC) 10 is to be converted into equivalent logic hardware of a new PLC 20. Original PLC 10 includes racks 110 and 120 coupled together by a bus 130. The hardware components of racks 110 and 120 of the original PLC 10 are identified and a corresponding I/O list is generated. An equivalent hardware component list is generated for new PLC 20 and a one-to-one I/O address mapping between the components of original PLC 10 and the components of new PLC 20 is generated.

Original PLC 10 includes a 115 volt AC power supply 140 and five hardware components including CPU 150 and hardware components 160, 170, 180 and 190 all mounted in respective slots in rack 110. The second rack 120 contains another 115 volt AC power supply 210 together with hardware components 220, 230 and 240 mounted in respective slots in rack 120. The rack slots 250 of rack 120 are unused in this example. In the example shown in FIG. 1, original PLC 10 is a SERIES-1 Programmable Logic Controller and components 110-250 are SERIES-1 hardware modules and components manufactured by GE Fanuc North America, Inc.

In this example, new PLC 20 is configured as equivalent to original PLC 10 by the method described subsequently. The equivalent control program for new PLC 20 is likewise generated from the control program for original PLC 10 as also will be described. In this particular example, new PLC 20 includes a single rack 310 which contains a 115 volt AC power supply 320 and four hardware components 330, 340, 350 and 360 mounted in respective slots in rack 310. Hardware slot 370 of rack 310 is a spare slot in this example. In the embodiment shown in FIG. 1, new PLC 20 is a SERIES 90-30 Programmable Logic Controller, and hardware components 310-370 are SERIES 90-30 modules and components manufactured by GE Fanuc North America, Inc.

The conversion of the PLC 10 hardware configuration and control logic program to the equivalent PLC 20 hardware configuration and control logic program includes the steps of generating a ladder logic program file of the original PLC 10 control logic program and generating a list of the I/O module content of the original PLC 10. The method further includes the step of generating an equivalent hardware content for the new target PLC 20 and the step of mapping I/O points between the original PLC 10 and the new PLC 20. The method also includes the step of generating a control logic program for new PLC 20 which is equivalent to the control logic program of original PLC 10. The hardware configuration and control logic program translations are performed with the aid of a knowledge based artificial intelligence computer program which is used as a ladder logic translator program as explained later.

Figure 2:
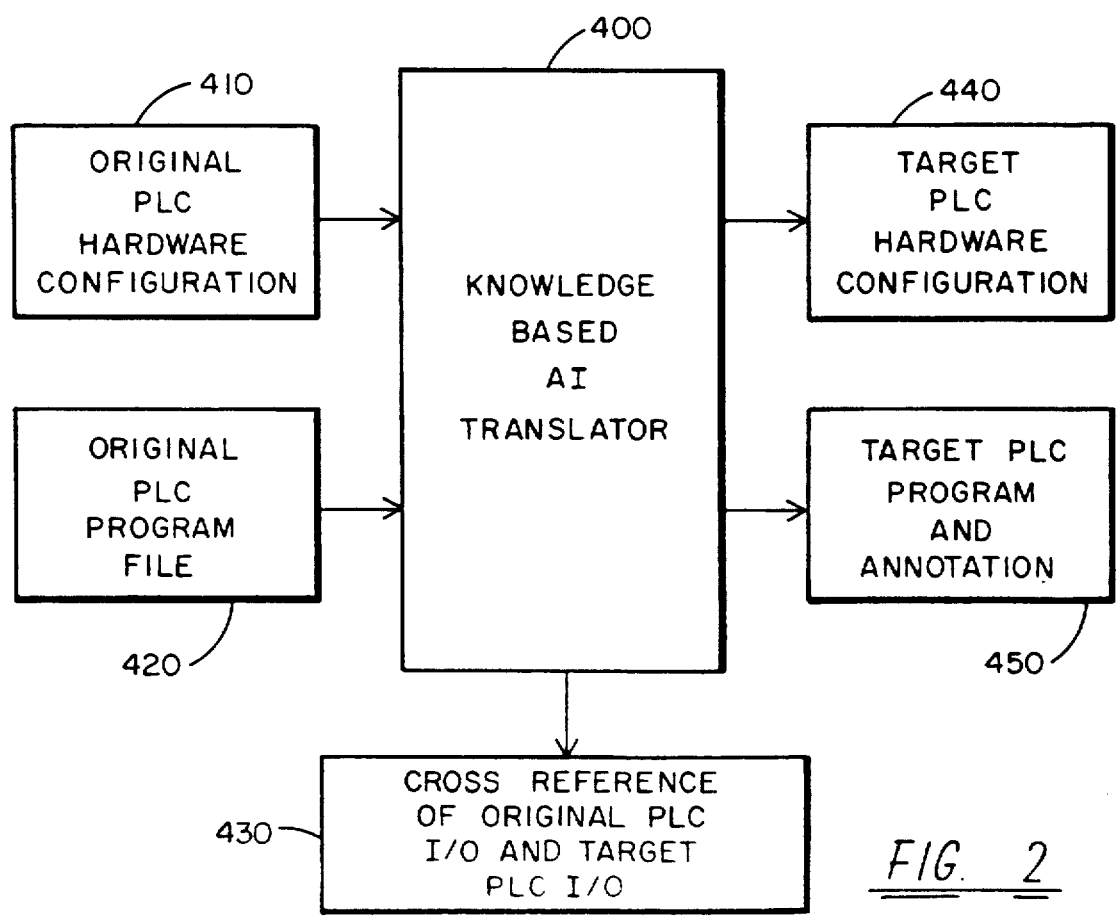
FIG. 2 is a functional block diagram of the hardware and logic translator of the present invention.

FIG. 2 shows a flow diagram of the method for converting the original PLC 10 control logic program or application to a control logic program or application for the new target PLC 20. A knowledge based artificial intelligence translator computer program 400, which employs the methodology of artificial intelligence (AI), employs the following inputs: an original PLC hardware configuration file 410 which is input to the translator program through operator interaction and which describes the original PLC 10 hardware and an original PLC 10 control program file 420. Translator program 400 is operator interactive and generates the following as outputs: a cross reference list 430 of original PLC 10 I/O points and new target PLC 20 I/O points, a new PLC 20 hardware configuration 440 and an annotated new PLC 20 control program 450.

Translator program 400 includes a data base containing information on all of the available hardware modules or I/O cards for both the original PLC 10 and for the new target PLC 20 as well as the correspondence between them. It further contains compiled knowledge based rules which include addressing information and heuristics for mapping I/O points between the original PLC 10 and new target PLC 20. Translator program 400 also includes a data base of new target PLC 20 programmer key mnemonics and their integer equivalents, an interpreter, and a map which relates all original PLC 10 control program elements to a set of interpretive steps and keystrokes.

Translator 400 generates an output file 450 (see FIG. 2) which is a keystroke list input for the new target PLC 20. In the past, PLC's were programmed by human operators manually entering keystrokes whereas in the present invention such keystrokes are generated mainly by translator computer program 400. Moreover, the same keystroke list file generated for new PLC 20 is usable as a high level program input to future PLC's having the same or similar keystroke program input but operating with totally different internal machine coding.

Figure 3:
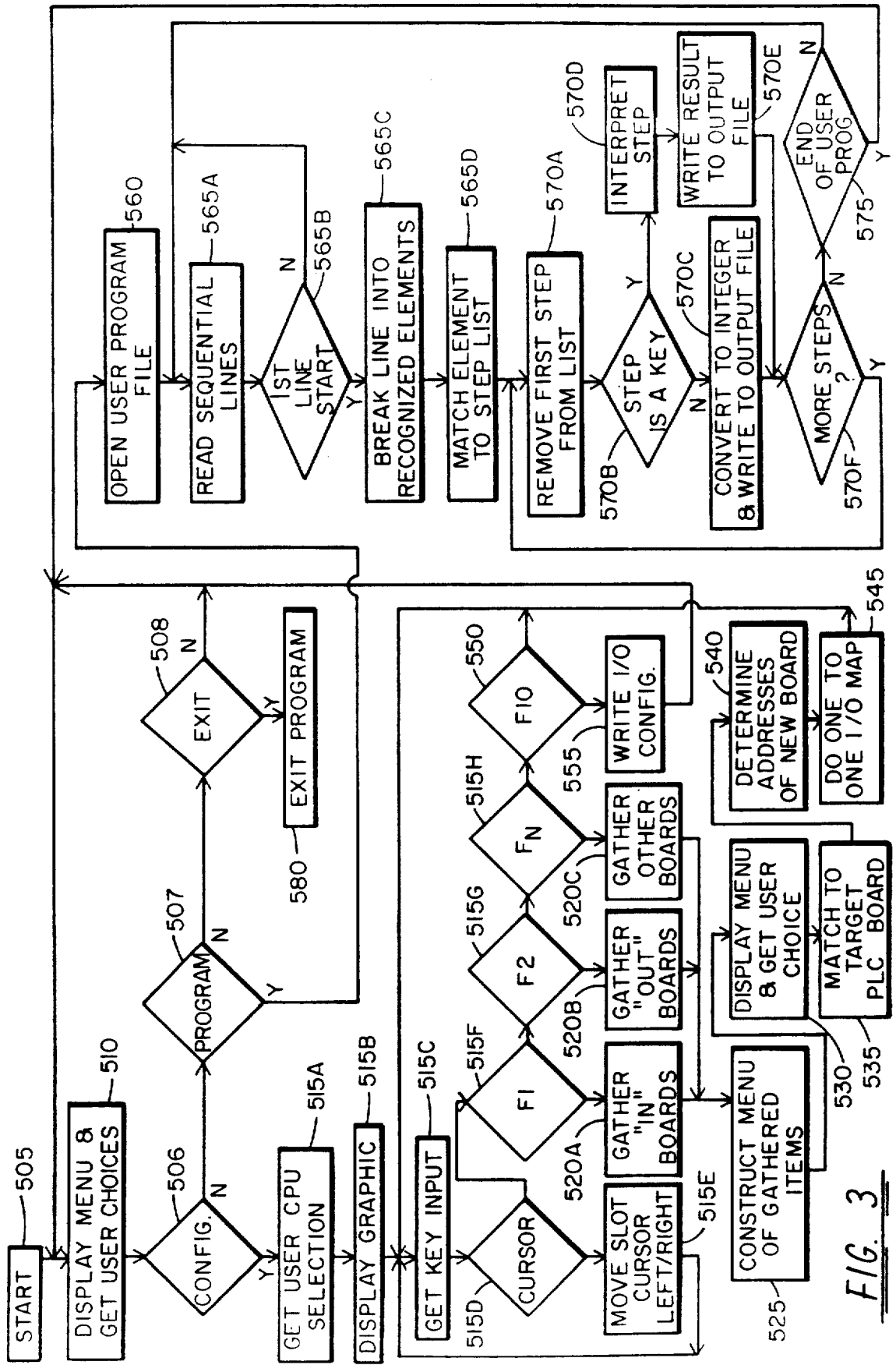
FIG. 3 is a flow chart of the translator program for converting PLC applications.

FIG. 3 is a flow diagram of one translator program 400 which is used to carry out the method of the present invention. Translator program 400, which is preferably executed on a personal computer, functions as follows.

Program 400 begins at start block 505 and displays a menu with user choices CONFIGURATION 506, PROGRAM 507 or EXIT 508 that may be selected in block 510. In actual practice, CONFIGURATION 506 is generally selected first, and in that mode a new target PLC hardware configuration is generated based on an old original PLC hardware configuration.

Next, PROGRAM 507 is selected, and in that mode the ladder logic program (control program) of the old original PLC 10 is translated into a keystroke program (control program) for the new target PLC 20. Finally, the translator computer program 400 is terminated with the EXIT selection as per block 508.

In more detail, when CONFIGURATION is selected in block 506, the user is prompted in block 515A for the particular hardware CPU used in the original PLC 10 configuration. As indicated at block 515B, a graphic presentation menu is then displayed from which the rest of the original PLC 10 hardware is selected. The user interface blocks 515C-E of program 400 allow the user to highlight PLC 10 hardware slots on a graphic menu presentation corresponding to hardware module slot locations on the PLC 10. As the computer cursor keys are operated by the user, different module slots are highlighted and, for each highlighted slot, a menu of possible hardware choices is presented on the computer screen. The user selects from these choices by pressing computer keys labelled F1, F2, ... Fn corresponding to the desired selection from the menu displayed by program 400 and corresponding to program decision blocks 515F-H. Each choice F1 through Fn has associated with it one of n possible hardware modules which may be contained in the original PLC 10. Upon user selection of the appropriate hardware module, program 400 gathers from its data base the appropriate hardware configuration possibilities for the chosen module in one of blocks 520A-C, constructs a user menu of the available choices in block 525 and displays that menu in block 530.

Program 400 matches the user selected hardware with corresponding equivalent hardware for target PLC 20 in program block 535, determines the I/O correspondence between the original PLC 10 modules and new PLC 20 modules in block 540 and makes the appropriate I/O mapping entry into the I/O table file in block 545.

Program 400 control reverts to the user graphic interface 515 defined by blocks 515A-515H at which hardware choices are subsequently entered by the user. To exit the above described program loop, the user selects choice F10 at program block 550. Program 400 then writes the hardware configuration and I/O map determined in blocks 530-545 into permanent user files in program block 555. Those user files were shown as outputs 430 and 440 of program 400 in FIG. 2. User files 430 and 440 are used later with the PLC 20 logic programmer package in the fashion referred to earlier to automatically enter the hardware content and the base address settings for the target PLC 20.

Returning to FIG. 3, after exiting as per block 550, control in program 400 returns to the main menu at block 510 subsequent to which the menu choice PROGRAM may be selected at block 507. This selection is used to translate the original PLC 10 control program file (shown as input 420 to program 400 in FIG. 2) into a set of keystrokes which enter an equivalent program element or an equivalent algorithm into the target PLC 20 via the PLC 20 logic programmer package.

A user program file (shown as input 420 in FIG. 2) representing the original PLC 10 control program is opened in program block 560. That file is an ASCII print file which contains a rung by rung ladder logic symbolic representation of the original PLC 10 control program. Blocks 565A-D of Program 400 read this input file line by line, recognize program elements and match elements to a step list.

In more detail, block 565A with decision block 565B reads input lines of the original control program until a start line is found. Block 565C breaks lines from the original control program down into recognizable elements and block 565D matches elements to a step list. In blocks 570A-F of program 400, the step list is then sequentially interpreted if needed and is converted to keystrokes for the new target PLC 20 logic programmer in the form of an output file (designated 450 in FIG. 2).

The original ladder rungs and original PLC program comments are retained as annotated comments in the new control program contained in output file 450. That is, block 570A removes a step from the step list and decision block 570B tests whether the step is a new PLC 20 program keystroke. If it is determined in decision block 570B that the subject step is indeed a keystroke, then the step is converted to integer form and written to the new control program output file in block 570C. If the step is not a keystroke, it is interpreted into equivalent keystrokes in block 570D and written to the output file in block 570E. Block 570F causes the translation blocks 570A-E to iterate until all steps in the step list are translated and written to the output file 450 for the new control program.

The PROGRAM function of Program 400 terminates through block 575 at the end of user data and reverts back to the main menu section where EXIT may be selected at block 508. Program 400 then terminates at block 580 and returns control to the host computer.

Returning to FIG. 2, in this embodiment of the method of the invention, the translator program 400 employed as part of the conversion process of the invention is an "Artificial Intelligence" computer program written using the Turbo Prolog (a registered trademark of Borland International) language and is executed on an IBM personal computer (a registered trademark of International Business Machines Corp.) or compatible personal computer under the DOS (disk operating system) environment. Input 420 is now recognized as a DOS input file and outputs 430, 440, and 450 are DOS output files on the host personal computer. Input 410 is the set of user keyboard entries and menu choice responses selected under program 400 control. Those skilled in the art will appreciate that other computer languages, computer operating systems and computers can be substituted for those listed above with substantially the same results.

Figures 4, 5:
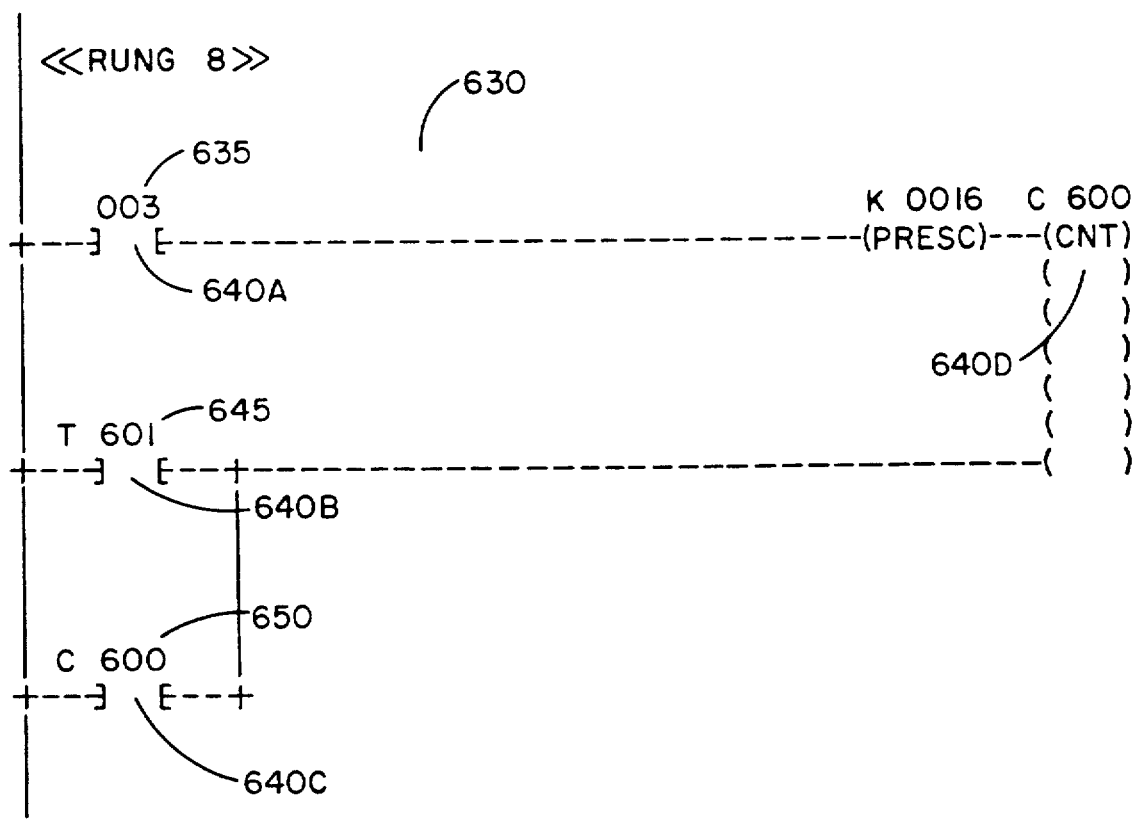
FIG. 4 is a one-to-one map of physical I/O points between the original and new PLC's.
FIG. 5 is a portion of a ladder diagram for one PLC showing ladder logic for one rung.

To more clearly illustrate a portion of the conversion process of the invention, one example of a partial file listing of a one-to-one map of physical I/O points is shown in FIG. 4. In each map statement the first number 610, which is an I/O point of the original PLC 10, maps directly into the second number 615, which is an I/O point of the new target PLC 20. In the particular example of FIG. 4, the first numbers 610 in parentheses are octal slot-based addresses particular to the SERIES-1 PLC, while the second associated numbers 615 use decimal numbering following the standard IEC memory type designator: % I for inputs and % Q for outputs, which are particular to the SERIES 90-30 PLC.

It is not always desirable that the PLC program translation or conversion be fully automatic. In some cases opportunities exist to improve the performance of certain PLC program functions when transferring an control program application from one original hardware configuration to a new target configuration. The new target configuration may contain desirable functions which did not exist on the original PLC, or there may be instances where there is no one-to-one correspondence between the ladder logic constructs of the original PLC and those of the target PLC. In those cases, manual intervention in the translation process is desirable. In the case where a one-to-one correspondence does not exist, special symbols are inserted by the translator into file 450 identifying any such occurrence. Likewise, the user of the translator program is given the option the leave certain constructs in the original PLC control program untranslated, so that he/she can take advantage of improvements in the instruction set of the target PLC. If this option is exercised, special symbols are inserted into file 450 identifying each occurrence. In both cases, manual intervention is accomplished later using the programming system software for the target PLC to edit the desired commands into the target program.

FIG. 5 shows one rung 630 (RUNG 8) of an ASCII file containing an original PLC 10 control program ladder logic representation which serves as one rung of input file 420 to translator program 400. The translator 400 processes this ASCII information by recognizing string 635 ("003") as an input point and generates the corresponding PLC 20 keystrokes "% I4" as the corresponding I/O point as shown earlier in FIG. 4. The translator program 400 contains many "equivalents" statements in its data base, as for example, the equivalents statements:

```
equiv("—]
     [—",[NO_CONTACT,REF,NAME,ENTER])

equiv("—( )",[COIL,REF,NAME,ENTER])
```

Each time the ASCII symbols "—] [—" are encountered by translator program 400, translator 400 will equate those symbols with the list in brackets. It will:

(1) Convert the NO_CONTACT (normally open contact) into its integer equivalent and write the integer into the keystroke file 450. That integer is directly recognized as input by the new PLC 20 programming package.

(2) Process the REF symbol by looking at the reference which was associated with the contact in the ASCII file of the original PLC 10 program, for example, the reference to symbols "003" is converted to the corresponding I/O reference "% I4". The ASCII characters to enter this I/O reference are added to the keystroke file 450.

(3) Process the NAME symbol by locating the nickname (none is shown in this example) associated with the reference, and modify it to conform to the PLC 20 programmer naming conventions, and enter the corresponding ASCII characters into the keystroke file 450.

(4) Convert the ENTER symbol to its integer equivalent and enter that integer equivalent into the keystroke file 450.

Thus, references to contacts 640A, 640B and 640C in FIG. 5 are similarly translated using the database rules given above.

When the translator program 400 encounters the "—( )" ASCII symbols, that is, the symbols within the quote marks shown in the second equivalents statement above, it performs an analogous set of operations according to the second "equivalents" database statement. Thus, coil 640D of FIG. 5 is translated to the appropriate keystrokes according to the second "equivalents" statement above. The references 645 and 650 to addresses "601" and "600" in FIG. 5 are respectively translated to addresses "% T0236" and "% T0235" as shown in the table of FIG. 4. Other "equivalents" database statements (not shown here) have additional levels of complexity and are appropriately handled by translator program 400.

The foregoing describes a method for converting from an original PLC application to a new PLC application. That is, a method is described for selecting the hardware components and configuration of a new PLC with reference to the hardware components and configuration of an original PLC. Furthermore, the method provides for the translation of an original ladder logic control program to a keystroke file which is directly usable to program the new PLC.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A method for converting a first control program and a first hardware configuration for a first PLC to a second control program and a second hardware configuration for a second PLC, said first and second control programs including a plurality of statements, said method comprising the steps of:

providing configuration information with respect to said first hardware configuration of said first PLC to a processor;

providing said first PLC control program to said processor;

selecting said second hardware configuration to be equivalent to said first hardware configuration by said processor referencing a data base which relates said first hardware configuration to possible second hardware configurations;

generating a mapping of I/O points from said first PLC to said second PLC; and generating said second control program to be equivalent to said first control program, said second control program being generated by said processor referencing each statement of said first control program and determining a statement operative on said second PLC which is equivalent thereto.

2. The method of claim 1 wherein said first control program is an ASCII representation of ladder logic constructs of said first PLC.

3. The method of claim 1 wherein said second control program is a keystroke file.

4. The method of claim 1 including the additional step of:

flagging for manual conversion predetermined statements of said first control program, such that statements having no exact equivalents and those statements which can be manually optimized for said second PLC can be manually converted.

5. A method for converting a first control program and a first hardware configuration for a first PLC to a second control program and a second hardware configuration for a second PLC, said first PLC including a rack into which a plurality of first PLC hardware modules may be situated, said second PLC including a rack into which a plurality of second PLC hardware modules may be situated, said first control program include a plurality of logic statements, said method comprising the steps of:

displaying a representation of a plurality of hardware modules which are usable with said first PLC; selecting from said plurality of hardware modules in said displaying step those modules which are actually employed in a particular hardware configuration for said first PLC;

creating a first hardware configuration representation of the hardware configuration selected in said selecting step;

determining those second PLC hardware modules which are equivalent to first PLC hardware modules employed in said first hardware configuration by referencing a first data base which includes information as to which hardware modules for use on said second PLC are equivalent to corresponding hardware module for use on said first PLC;

generating a mapping of I/O points from said first PLC to I/O points of said second PLC, said determining and generating a mapping steps thus defining said second hardware configuration of said second PLC; and generating said second control program for use with the second PLC from the statements of said first PLC and said mapping of I/O points.

6. The method of claim 5 wherein said step of generating said second control program includes referencing each statement of said first control program to a second data base which relates statements usable on said first PLC to equivalent statement usable on said second PLC, such that each statement of said first control program is referenced to determine an equivalent statement operative on said second PLC.

7. The method of claim 5 wherein said first control program is an ASCII representation of ladder logic constructs of said first PLC.

8. The method of claim 5 wherein said second control program is a keystroke file.

9. The method of claim 5 including the additional step of:

flagging for manual conversion predetermined statements of said first control program, such that statements having no exact equivalents and those statements which can be manually optimized for said second PLC can be manually converted.

* * * * *